United States Patent
Takeuchi et al.

(10) Patent No.: US 9,083,159 B2
(45) Date of Patent: Jul. 14, 2015

(54) CABLE SUPPORT MEMBER AND CABLE SUPPORT DEVICE

(75) Inventors: Hiroshi Takeuchi, Fuefuki (JP); Akira Kubota, Kofu (JP); Yasuhiro Misu, Kofu (JP)

(73) Assignee: JUNKOSHA INC., Kasama-Shi (JP)

( * ) Notice: Subject to any disclaimer, the term of this patent is extended or adjusted under 35 U.S.C. 154(b) by 0 days.

(21) Appl. No.: 14/008,163

(22) PCT Filed: Mar. 1, 2012

(86) PCT No.: PCT/JP2012/055895
§ 371 (c)(1),
(2), (4) Date: Sep. 27, 2013

(87) PCT Pub. No.: WO2012/132810
PCT Pub. Date: Oct. 4, 2012

(65) Prior Publication Data
US 2014/0042280 A1     Feb. 13, 2014

(30) Foreign Application Priority Data

Mar. 28, 2011  (JP) .................................. 2011-070217
Sep. 30, 2011  (JP) .................................. 2011-218115

(51) Int. Cl.
*F16L 3/00*     (2006.01)
*H02G 1/00*     (2006.01)
(Continued)

(52) U.S. Cl.
CPC ............... *H02G 1/00* (2013.01); *H02G 3/0475* (2013.01); *H02G 11/00* (2013.01)

(58) Field of Classification Search
CPC ....... F16G 13/16; F16G 13/20; H02G 11/006; H02G 1/00; H02G 3/0475; H02G 11/00; G02B 6/4461
See application file for complete search history.

(56) References Cited

U.S. PATENT DOCUMENTS 6,890,278 B2 *  5/2005  Prince ............................ 474/206
6,997,412 B2 *  2/2006  Komiya ...................... 242/615.2
(Continued)

FOREIGN PATENT DOCUMENTS

JP     08-047153      2/1996
JP     2003-106381    4/2003
(Continued)

OTHER PUBLICATIONS

International Search Report dated Apr. 9, 2012.

*Primary Examiner* — Amy Sterling
(74) *Attorney, Agent, or Firm* — Rankin, Hill & Clark LLP

(57) ABSTRACT

An object of the invention is to provide a cable support member having high durability and excellent manufacturing performance. A cable support member of the invention includes: a plurality of holding members; and an elastic member. Each holding member has an elastic member insertion passage through which the elastic member is inserted, and has joint surfaces enabling a rotation of the holding member with coming into contact with the adjacent holding members at both sides in the longitudinal direction. The elastic member is inserted through the elastic member insertion passages in the holding members so as to align and maintain the holding members, and exerts a compression force on the holding members. With such a configuration, a neutral state where the cable support member is substantially in a linear fashion and a curved state where the cable support member is bending-deformed are obtainable.

12 Claims, 7 Drawing Sheets

(51) Int. Cl.
*H02G 3/04* (2006.01)
*H02G 11/00* (2006.01)

(56) References Cited

U.S. PATENT DOCUMENTS

| | | | |
|---|---|---|---|
| 7,484,351 B2 * | 2/2009 | Harada et al. | 59/78.1 |
| 7,552,581 B1 * | 6/2009 | Pfeifer et al. | 59/78.1 |
| 8,549,831 B2 * | 10/2013 | Dunham et al. | 59/78.1 |
| 2004/0112625 A1 | 6/2004 | Sheikholeslami et al. | |
| 2011/0121141 A1 * | 5/2011 | Tatsuta et al. | 248/49 |
| 2012/0267164 A1 * | 10/2012 | Reuss et al. | 174/70 R |

FOREIGN PATENT DOCUMENTS

| | | |
|---|---|---|
| JP | 4157096 | 7/2008 |
| JP | 4658221 | 1/2011 |

\* cited by examiner

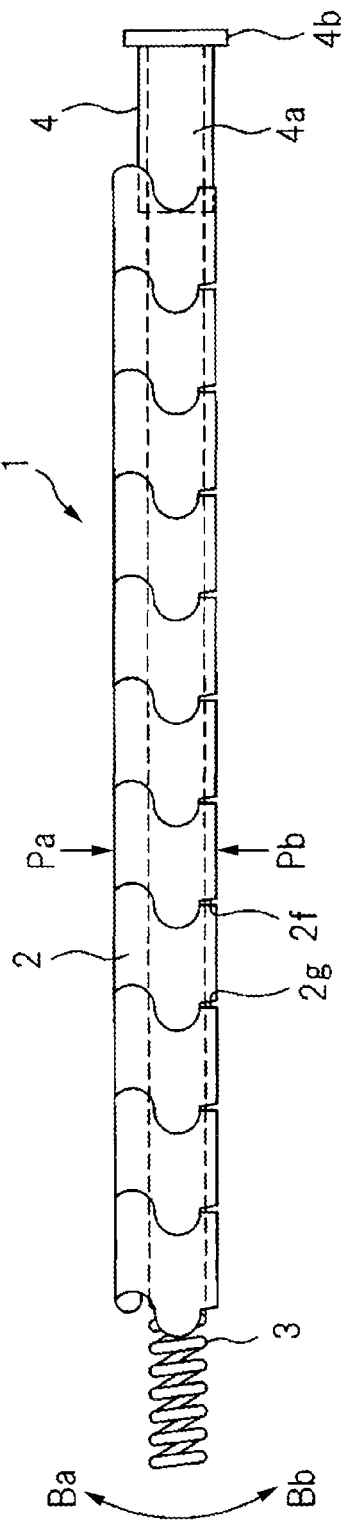

CABLE SUPPORT MEMBER AND CABLE SUPPORT DEVICE

TECHNICAL FIELD

The present invention relates to a cable support device which is integrated with a cable and supports the cable, and to a cable support member and a cable support device which support a cable used for a robot driving device or the like that is incorporated in, for example, a machining line, a semiconductor manufacturing apparatus, an electronic component mounting apparatus, or the like.

BACKGROUND ART

In a machining line, a semiconductor manufacturing apparatus, or an electronic component mounting apparatus, a robot driving device is incorporated for gripping and conveying work pieces such as materials to be processed, wafers, substrates, or the like. The robot driving device has a robot for handling work pieces for example, which is mounted on a traveling carriage that reciprocates on a track. By operating a hand of an arm of the robot, a work piece may be gripped by the hand, and then the work piece may be attached to and detached from each processing machine.

An electric cable, an optical cable, a tube for supplying hydraulic or pneumatic power or the like (hereinafter, referred to as a "cable") is connected to the traveling carriage of the robot driving device. Since the traveling carriage continuously reciprocates such that a position of the traveling carriage is varied, it is required to steadily move the cable along with the traveling carriage so that the cable follows the variation in position of the traveling carriage. For this reason, for example, a multi-joint type cable support member called Cable Bear (registered trademark) is known which allows a cable to follow the variation in position of the traveling carriage by bending the cable having a given length to be curved in a U shape to support the cable and changing the lengths of the opposite legs of the U shape.

Such a cable support member, which is bendable in a U shape, is disclosed in Japanese Patent No. 4658221. The cable support member (multi-joint support member) disclosed in Japanese Patent No. 4658221 is constituted by a series of synthetic resin block bodies connected by pin couplings. Further, in Japanese Patent No. 4658221, the cable support member is inserted through and integrally clamped to a flexible belt member, which is provided with a plurality of conduits in parallel arrangement, together with cables so that a multi joint type protective guide device for the cable is configured. In addition, the support member may be bent to a given radius of curvature based on the shapes of the block bodies, while a horizontally straight state of the support member is maintained against gravity, or the support member is prevented from being curved to be convex downward.

A cable support member, which is bendable in a U shape, is also disclosed in Japanese Patent No. 4157096. In Japanese Patent No. 4157096, the cable support member is constituted by a belt-shaped stainless steel strip (a flexible material) having a spring property, and a series of synthetic resin holding members (a non-interlocking solid material) fixed to the stainless steel strip by an injection molding. Further, a cable support structure, in which the cable support member is inserted through and integrally clamped to the a plurality of channels in parallel arrangement, together with cables, is disclosed in FIG. 21 or the like of Japanese Patent No. 4157096.

While the series of synthetic resin block bodies in the cable support member of Japanese Patent No. 4658221, including pins used for connection, may be comparatively simply manufactured by an injection molding, it is necessary to fit all the pins of the plurality of synthetic resin block bodies into corresponding holes when connecting the synthetic resin block bodies. Therefore, the assembling property thereof may not be necessarily good. Further, a dimension in an axial direction (longitudinal direction of the cable) becomes longer due to a space required to connect the synthetic resin block bodies to each other with the pins, and thus, there is a problem in that a possible minimum radius of curvature when the cable support member is bent, and therefore a space required for wiring may not be reduced.

The holding member (non-interlocking solid material) of the cable support member of Japanese Patent No. 4157096 is fixed to the stainless steel strip by the injection molding. However, in the case of this structure, a portion of the stainless steel strip, which is fixed to the holding member, does not effectively act as a spring. This matter becomes a disadvantageous factor when designing a spring of the stainless steel strip, and thus there is a concern in that sufficient fatigue strength may not be obtained. Further, the process of injection molding of the holding members to the stainless steel strip is recognized as a factor that degrades productivity.

Further, the cable support members of Japanese Patent Nos. 4658221 and 4157096 may be moved in one direction within a certain range, but absolutely may not be moved in the opposite direction, which is opposite to the one direction, due to an operation of a stopper. For this reason, in a case in which a load in the opposite direction is applied to the cable support member, there is a concern in that in the cable support member of Japanese Patent No. 4658221 pin coupling portions of the synthetic resin block bodies are damaged, or in the cable support member of Japanese Patent No. 4157096 the stainless steel strip (flexible material) and the holding member (non-interlocking solid material) are separated and damaged.

DISCLOSURE OF THE INVENTION

The present invention has been made in consideration of the above-described problems, and a first object thereof is to provide a cable support member and a cable support device, which have high durability. A second object is to provide a cable support member and a cable support device, which have excellent manufacturing performance.

In order to solve the above-mentioned problems, the present invention provides a cable support member including a plurality of holding members, and an elastic member, in which: each holding member has an elastic member insertion passage through which the elastic member is inserted, and further has joint surfaces that enable a rotation of the holding member in a state in which the holding member comes into contact with holding members adjacent to the holding member at both sides in a longitudinal direction of the cable support member; the elastic member is inserted through the elastic member insertion passage in each of the plurality of holding members so as to align and hold the plurality of holding members, and the elastic member exerts a compression force on the plurality of holding members; and in an overall shape of the cable support member, a neutral state in which the cable support member is substantially in a linear fashion and a curved state in which the cable support member is bending-deformed are obtainable.

According to this configuration, the plurality of holding members of the cable support member is held by being subjected to a compression load from the elastic member that is inserted through the plurality of holding members, but the plurality of holding members has a simple structure in which the holding members are not individually fixed to the elastic member, and further the plurality of holding members comes into contact with each other at the joint surfaces thereof without being connected to each other, for example, by pins or the like. Thus, the cable support device equipped with the cable support member, which has high durability and is easily manufactured, may be obtained.

Further, due to the above-described simple structure of the holding members, it is possible to considerably shorten a length of the holding members in an axial direction (the longitudinal direction of the cable), thereby obtaining the cable support member having a small minimum radius of curvature.

Further, the cable support member may be configured to be elastically bendable in one direction and an opposite direction to the one direction from the neutral state, and, a deflection amount of bending deformation in the opposite direction is smaller than a deflection amount of bending deformation in the one direction when the cable support member is subjected to a given bending load.

According to this configuration, the cable support member may be bending-deformed in the opposite direction even if the cable support member is difficult to be bent in the opposite direction in comparison with the one direction, so that even in a case in which an unpredictable large load is applied to the cable support member in the opposite direction, the cable support member may be deformed, thereby preventing breakage thereof.

In the present invention, when the cable is held in a horizontal direction, a deflection amount of bending deformation of the cable support member in the opposite direction due to the self-weight thereof may be substantially zero.

In the present invention, it is preferable that the elastic member is disposed to be orthogonal to reach of rotating axes of the plurality of holding members that are rotated when the cable support member is bending-deformed in the one direction.

In the present invention, the elastic member of the support member may be constituted by a cylindrical coil spring. Accordingly, the support member having high durability by high elastic deformation performance against the bending of the coil spring in the axial direction may be obtained.

In the present invention, the tube member may be configured such that a thickness of a wall portion of the tube member, which is positioned at an outer circumferential side when the cable support member is bending-deformed in one direction, is thicker than a thickness of a wall portion which is positioned at an inner circumferential side when the support device is bending-deformed in the one direction. When the outer circumferential side of the tube member is thick like this, it is possible to enhance an effect of attenuating vibrations and noise which occur, for example, due to contact with other members on which the cable support device is mounted when the cable support device is moved.

In the present invention, each of connection portions between the plurality of cable insertion passages of the tube member, which are disposed in parallel, and between the cable insertion passage and the support member insertion passage may be formed to be separable from each other by a human power. Accordingly, the cable insertion passage of the tube member at an end side, which is positioned outside the fixing unit, may be simply separated from the adjacent insertion passage at the connecting portion, and as a result, even if positions of access points of the plurality of cables are spaced apart from each other, the plurality of cables may access the respective access points in a state in which the plurality of cables is protected by the tube member.

In the present invention, the tube member may have two outer wall portions having outer surfaces and facing each other, and a partition wall portion having a wave-shaped cross section may be installed between the two outer wall portions and coupled to the two outer wall portions at respective top portions of wave shapes, and the support member insertion passage and/or the cable insertion passage may be formed by one wave shaped portion of the partition wall portion and the outer wall portions.

By forming the tube member as described above, the cables may be wired at a high density by decreasing the porosity in comparison with a tube member having an insertion passage having an oval, elliptical, or spindle shaped cross section, and bending stiffness of the tube member may be decreased in comparison with a tube member, for example, having an insertion passage having a rectangle cross section having a low porosity.

Further, in order to achieve the above-described objects, a cable support member of the present invention includes: a plurality of holding members each of which has a through hole formed therein, each holding member having joining portions to be rotatable in a state where the holding member are joined with other holding members at respective opening sides of the through hole; and an elastic member normally having a straight shape and having elasticity, which is inserted through the through hole in each of the plurality of holding members joined at the joining portions, in which; in a state in which the elastic member is inserted through and fixed to the plurality of holding members, the holding members are held in a joined state; and in a case in which from a state in which the holding members are joined in a linear fashion, the joined holding members are rotated in one direction and an opposite direction to the one direction, a displacement amount of the elastic member being displaced against an elastic force thereof when the holding members are rotated in the one direction is smaller than a displacement amount of the elastic member being displaced against the elastic force thereof when the holding members are rotated in the opposite direction.

According to this configuration, in a case in which a load (a load in one direction) toward the holding members from the elastic member is applied to the cable support member, because the plurality of holding members may be bent in the one direction, when the elastic member having elasticity (spring property) is bent in a U shape, the plurality of holding members is formed in the U shape according to the bending of the elastic member. Meanwhile, in a case in which a load (a load in the opposite direction and identical to the load in the one direction) toward the elastic member from the holding members is applied to the cable support member, because the plurality of holding members may be bent in the opposite direction, and bending force in the opposite direction becomes higher than bending force in the one direction, the elastic member having elasticity (spring property) is bent in a bow shape that is further open than the U shape, and the plurality of holding members has the bow shape according to the bending of the elastic member. Therefore, the cable support member may be provided which is easy to be bent in the one direction, and difficult to be bent in the opposite direction, such that the cable support member is difficult to be broken even in a case in which a load in the opposite direction is applied.

Further, the elastic member is fixed to the holding member while tensile force is applied.

According to this configuration, a compression force is applied between the plurality of holding members such that the support force of the cable is increased, and the cable may be prevented from being deflected downward. Further, it is desirable that a through hole is formed so that a center of a longitudinal axis of the elastic member is disposed on rotating axes about which the plurality of holding members is rotated in the one direction at the joining portions.

BRIEF DESCRIPTION OF DRAWINGS

FIG. 2 is a partial front view illustrating one end portion side of the cable support member of the cable support device.

BEST MODE FOR CARRYING OUT THE INVENTION

Hereinafter, exemplary embodiments of a cable support member and a cable support device according to the present invention will be described. Further, the exemplary embodiments described below do not limit the present invention regarding the claims, and further, it is not limited that all combinations of features described in the exemplary embodiments are essential elements of the solution of the present invention.

Hereinafter, a cable support device 10 according to a first exemplary embodiment in which a cable support member of the present invention is used will be described.

Figure 1:
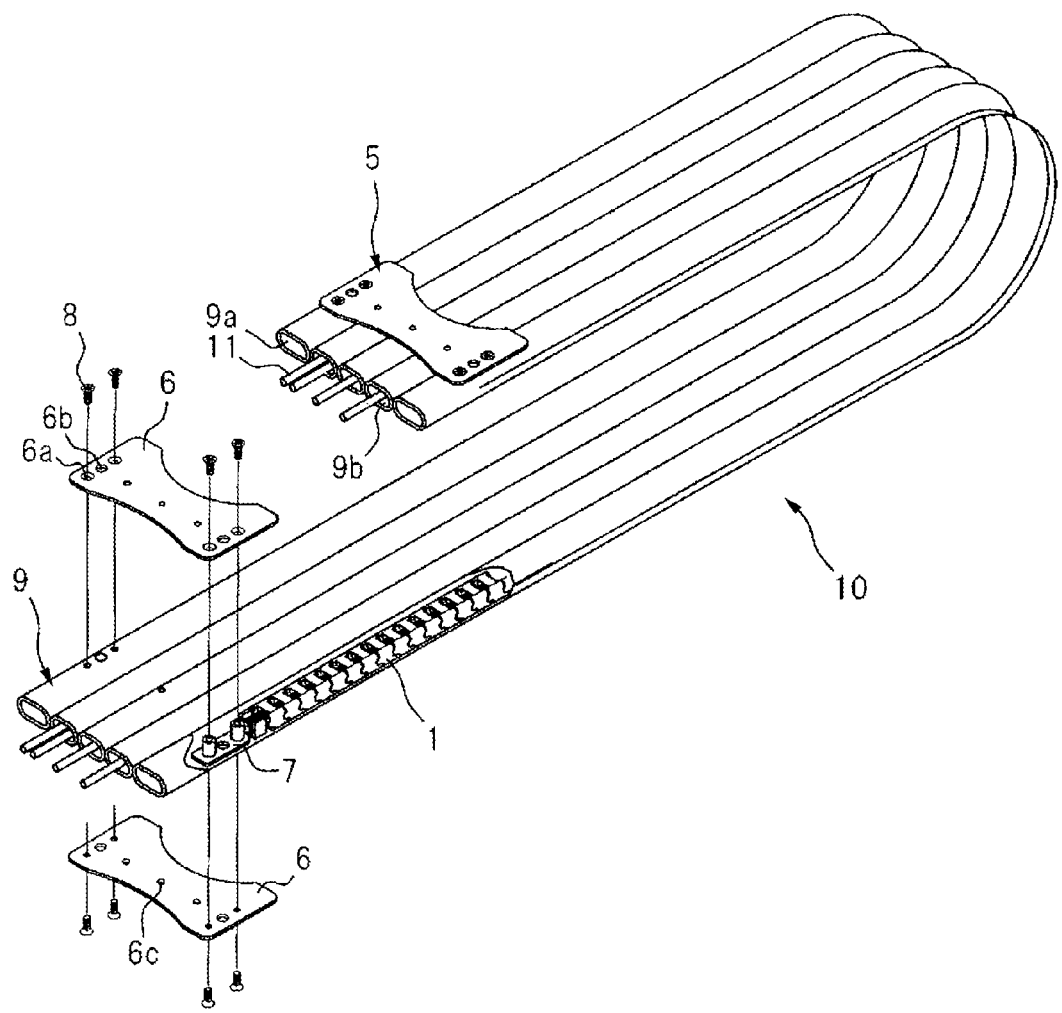
FIG. 1 is a perspective view of a cable support device according to a first exemplary embodiment in which a cable support member of the present invention is used, in which an exploded and partial broken-away view is included at one end side.

FIG. 1 is a perspective view illustrating a state in which the cable support device 10 of the first exemplary embodiment is bent in a U shape, in which an exploded and partial broken away view is included at one end side of the device. The cable support device 10 includes two cable support members 1 (only one cable support member 1 is indicated in the drawing) which extends in a longitudinal direction of a cable 11 to be supported, a tube member 9 which is made of a flexible material and has a plurality of tubes that are arranged therein, cables 11 which are inserted through the tube member 9, and two fixing units 5 which are provided at both end portions in order to fix the cable support members 1 together with the tube member 9.

The tube member 9 in the present exemplary embodiment includes two support member insertion passages 9a through which the cable support members 1 are inserted and which extends in parallel to each other at both outer sides of the tube member 9, and three cable insertion passages 9b which are disposed between the support member insertion passages 9a in parallel to each other and through which the cables 11 are inserted. In the present exemplary embodiment, each of the insertion passages has an oval cross-sectional shape, and the adjacent insertion passages are coupled to each other at end portions of the oval shape. Further, the tube member 9 may be fabricated by bonding two sheets made of, for example, EPTFE as a base material, while leaving spaces for the insertion passages, or through melt extrusion molding of a polyvinyl chloride material.

Further, while the cross-sectional shape of the insertion passage of the tube member 9 is an oval shape in the exemplary embodiment of FIG. 1, an exemplary embodiment in which the cross-sectional shape of the insertion passage of the tube member 9 is a spindle shape, an elliptical shape, a circular shape, a rectangular shape, or the like is also possible in the present invention.

FIG. 2 is a view illustrating one end side of the cable support member 1 according to the present invention. The cable support member 1 has a length which extends along the longitudinal direction of the cable 11 to be supported, and further, includes a plurality of rectangular parallelepiped shaped holding members 2 which are arranged along the longitudinal direction of the cable 11, one elastic member 3 including a cylindrical coil spring 3 which penetrates the plurality of holding members 2 that are arranged in the longitudinal direction of the cable 11, and two sleeve members 4 which are fixed to both end portions of the elastic member 3, respectively, although only one sleeve member 4 at one end side is indicated in FIG. 2. Further, the shape of the holding members 2 is not limited to the rectangular parallelepiped shape, and may be a cylindrical shape or the like. In addition, the number of the elastic members 3, which penetrate the holding members 2, is not limited to one, and a configuration in which two or more elastic members 3 penetrate the holding members 2 may be acceptable.

As a material of the holding members 2, for example, a resin material such as liquid crystal polymer (LCP), polyacetal (POM), polyetheretherketone (PEEK), polybutylene terephthalate (PBT), or the like, a metallic material such as aluminum, a wooden material, or the like may be exemplified. Further, in order to increase the abrasion resistant performance, glass filler may be mixed with the resin material, and further, in order to decrease friction, polytetrafluoroethylene (PTFE) may be mixed. In addition, while the elastic member 3 is a cylindrical coil spring made from a stainless steel wire in the exemplary embodiment of FIG. 2, the elastic member 3 may be configured as, for example, a bar-shaped member made from a rubber material as long as the elastic member 3 has a high elastic deformation performance against the deformation in an axial direction and the bending deformation.

Figure 3A:
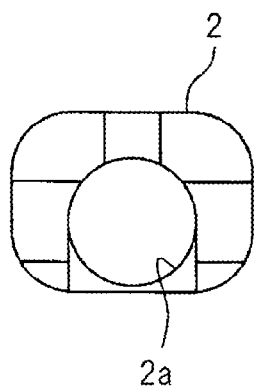
FIGS. 3A to 3C are trihedral views of a holding member of the cable support member.
Figure 3B:
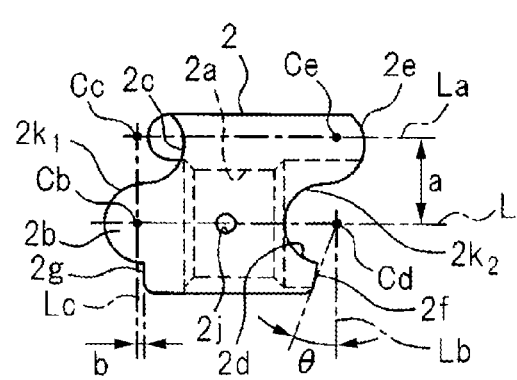

As illustrated in FIG. 3A, the holding member 2 is formed with an elastic member insertion passage (through hole) 2a therethrough in the longitudinal direction of the cable in which the elastic member 3 is fit through the holding member 2. The shape of the elastic member insertion passage (through hole) 2a is not limited to a hollow cylindrical shape and any shape thereof is acceptable as long as the elastic member may be inserted through and held in the elastic member insertion passage (through hole) 2a. Therefore, the elastic member insertion passage (through hole) 2a may have, for example, a C-shaped cross-sectional shape of which a portion is opened, or may be a rectangular shaped hole or the like. Further, as illustrated in FIG. 3B, the holding member 2 has a first joint surface $2k_1$ formed at one side in the longitudinal direction of the cable, and a second joint surface $2k_2$ formed at the other side. The first joint surface $2k_1$ is constituted by an end surface in the longitudinal direction of the cable, which includes a semicircular first convex portion $2b$ and a semicircular first concave portion $2c$ continuously connected to the first convex portion $2b$. Further, the second joint surface $2k_2$ is constituted by an end surface in the longitudinal direction of the cable, which includes a semicircular second concave portion $2d$ and a semicircular second convex portion $2e$ continuously connected to the second concave portion $2d$. In order to fit the first joint surface $2k_1$ and the second joint surface $2k_2$ with each other, the first convex portion $2b$ and the second concave portion $2d$, and the first concave portion $2c$ and the second convex portion $2e$ have the same diameter, respectively.

When the plurality of holding members 2 are arranged side by side in the longitudinal direction of the cable, the first convex portion $2b$ is fitted with the second concave portion $2d$, and the second convex portion $2e$ is fitted with the first concave portion $2c$. Further, the first convex portion $2b$ and the second concave portion $2d$ are formed so that arc centers Cb and Cd thereof are positioned on the central axis L of the elastic member 3 fit through the elastic member insertion passage (through hole) $2a$ when viewed from FIG. 3B. In addition, the second convex portion $2e$ and the first concave portion $2c$ are formed so that arc centers Ce and Cc thereof are positioned on a straight line La, at an upper side of FIG. 3B, which is spaced apart from the central axis L by a distance a.

Further, in the second concave portion $2d$, at the opposite side to the side where the second convex portion $2e$ is formed, an inclined portion $2f$ is formed with being inclined at an angle θ with respect to a straight line Lb which passes through the arc center Cd and which is orthogonal to the central axis L. Meanwhile, in the first convex portion $2b$, at the opposite side to the side where the first concave portion $2c$ is formed, a straight portion $2g$ is formed with being shifted by a distance b with respect to a straight line Lc which passes through the arc center Cb and which is orthogonal to the central axis L is formed. When the plurality of holding members 2 are arranged side by side in the longitudinal direction of the cable, a gap is formed between the inclined portion $2f$ and the straight portion $2g$.

Figure 3C:
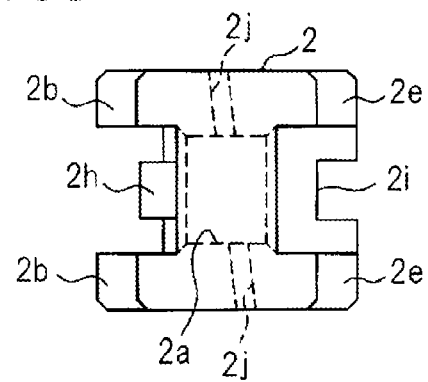

Further, as illustrated in FIG. 3C, the holding member 2 has a rectangular convex portion $2h$ formed at one side of the longitudinal direction of the cable, and a rectangular concave portion $2i$ formed at the other side of the longitudinal direction of the cable. When the plurality of holding members 2 are arranged side by side in the cable longitudinal direction, the convex portion $2h$ is fitted with the concave portion $2i$.

The holding member 2 configured as described above may be rotated in a clockwise direction or in a counterclockwise direction in a state in which the first joint surface $2k_1$ and the second joint surface $2k_2$ are in contact with the second joint surface $2k_2$ and the first joint surface $2k_1$ of the adjacent holding member 2, respectively. Further, in the holding member 2, the first convex portion $2b$, the first concave portion $2c$, the second concave portion $2d$, the second convex portion $2e$, the convex portion $2h$, and the concave portion $2i$ constitutes joining portions which allow the plurality of holding members 2 to be rotated when the plurality of holding members 2 are joined at opening sides of the through holes $2a$.

As illustrated in FIG. 2, the sleeve member 4 having a hollow cylindrical cylinder portion $4a$, and a flange portion $4b$ having a large diameter is fixed to an end portion of the elastic member 3. In the present exemplary embodiment, the sleeve member 4 is compressed and fixed to the end portion of the elastic member 3 that is inserted into the cylinder portion $4a$. However, an exemplary embodiment in which the sleeve member is fixed to the elastic member by other fixing methods such as welding, soldering, or fixing by a pin is possible. Further, similarly, the sleeve member 4 is fixed to the elastic member 3 also at the other end side, which is not illustrated in FIG. 2 and is opposite to the one end side of the support member 1.

Further, the cable support member 1 is configured so that a compression force is applied to the plurality of holding members 2, which is aligned, from the elastic member 3. For this reason, the elastic member 3, in a straight state illustrated in FIG. 2, is in a tensioned state in which the elastic member 3 is stretched from a free length thereof to a given length, and exerts a compression force on the plurality of holding members 2, which are disposed between two sleeve members 4, through the end surfaces of the cylinder portions $4a$ of two sleeve members 4 that are fixed to both ends of the elastic member 3. As illustrated in FIG. 2, the plurality of holding members 2 to which a compression force is applied are aligned in a linear fashion by bringing the joint surfaces (joining portions) thereof into contact with each other.

The force generated by the extended state of the elastic member 3 is applied to the holding members 2 through the sleeve member 4 in the exemplary embodiment illustrated in FIG. 2. However, when pin holes $2j$ (see FIGS. 3A to 3C) are formed in the holding members 2 positioned at both ends of the cable support member 1, pins (not illustrated) are passed through the pin holes $2j$, and the holding members 2 positioned at the both ends are engaged with the elastic member 3, the compression force may be applied through the two holding members to the plurality of other holding members 2 aligned at inside of the two holding members 2. Further, the elastic member 3 may be fixed when a pin is passed through the pin hole $2j$ of the holding member 2 at an arbitrary position of the cable support member 1.

Figure 4:
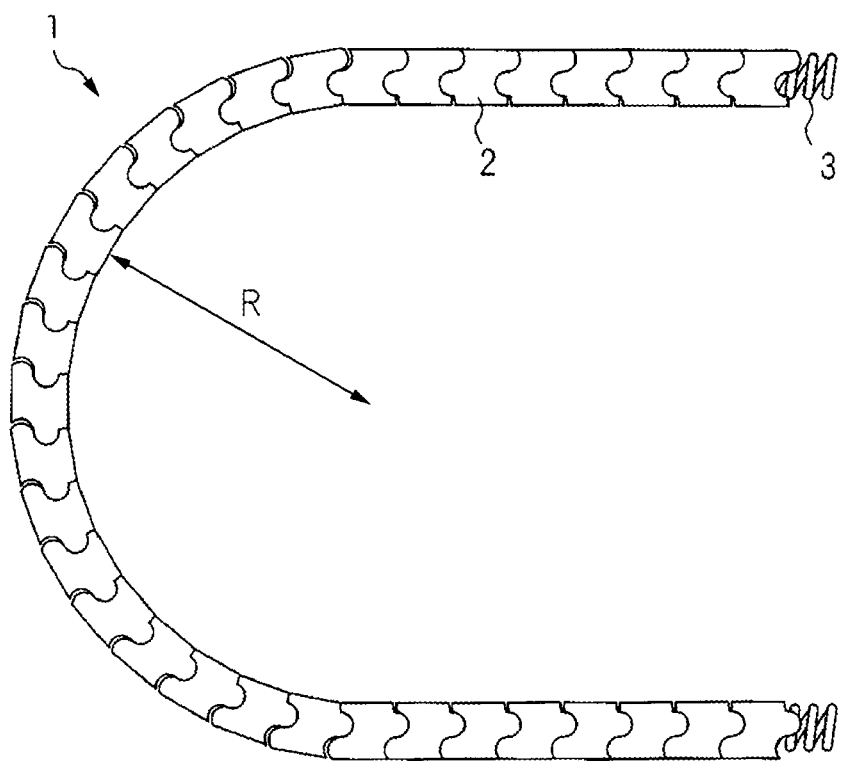
FIG. 4 is a front view illustrating the cable support member that is bent in a U shape in one direction.

According to the cable support member 1 configured as described above, in a case in which a load Pb in a direction toward the holding member 2 from the elastic member 3, that is, as illustrated in FIG. 2, a load (a load in one direction) in a direction in which the holding members 2 aligned by bringing the joint surfaces (joining portions) into contact with each other are rotated so that the straight portions $2g$ and the inclined portions $2f$ of the holding members 2 come into contact with each other, is applied to the cable support member 1, the cable support member 1 is bent in a Bb direction. At this time, the elastic member 3 is elastically bent in the Bb direction, and as illustrated in FIG. 4 mainly illustrating a U shaped curved portion of the cable support member 1, the plurality of holding members 2 are bent in one direction because the first convex portion $2b$ may be rotated in the second concave portion $2d$, and when the elastic member 3 is bent in a U shape, the plurality of holding members 2 have the U shape according to the bending of the elastic member 3. Here, the inclined portion $2f$ and the straight portion $2g$ are in contact with each other or closely aligned to each other at the U shaped portion, and a minimum radius R of curvature of the U shaped portion is determined by the angle θ of the inclined portion $2f$ and the length in an axial direction of the holding member 2. Further, a rotating center of the holding member 2 coincides with the arc centers Cb and Cd of the first convex portion $2b$ and the second concave portion $2d$.

Meanwhile, in a case in which a load Pa in a direction toward the elastic member 3 from the holding member 2, that is, a load (a load in the opposite direction) in a direction in which the holding members 2 aligned as illustrated in FIG. 2 are rotated so that the straight portions $2g$ and the inclined portions $2f$ of the holding members 2 are moved away from each other, is applied to the cable support member 1, the cable support member 1 is bent in a Ba direction. At this time, the elastic member 3 is elastically bent in the Ba direction, the plurality of holding members 2 are bent in the opposite direction because the second convex portion 2e may be rotated in the first concave portion 2c, and when the elastic member 3 is bent in a bow shape that is further open than the U shape, the plurality of holding members 2 have the arch shape according to the bending of the elastic member 3. At this time, the arc centers Cb and Cd of the first convex portion 2b and the second concave portion 2d are positioned on the center axis L of the elastic member 3, and the arc centers Ce and Cc of the second convex portion 2e and the first concave portion 2c are positioned on the straight line La that is spaced apart from the center axis L at the distance a, such that bending force in the opposite direction becomes higher than bending force in the one direction. Therefore, the cable support member 1 of the exemplary embodiment has a property that the cable support member 1 is easy to be bent in the one direction but difficult to be bent in the opposite direction. In other words, the cable support member 1 has a property that when a given bending load is applied to the cable support member 1 in a neutral state where the cable support member is in a linear fashion, a deflection amount of bending deformation in the opposite direction is smaller than a deflection amount in the one direction.

The reason is as follows. The arc centers Cb and Cd of the first convex portions 2b and the second concave portion 2d are positioned on the center axis L of the elastic member 3, and the arc centers Ce and Cc of the second convex portion 2e and the first concave portion 2c are positioned on the straight line La that is spaced apart from the center axis L at the distance a. Thus, as compared to the case in which the holding members 2 are rotated about the arc center Cb or Cd in the one direction, even if rotating amounts are the same, a displacement amount or an extension amount of the elastic member 3 becomes higher in the case in which the holding members are rotated about the arc center Ce or Cc in the opposite direction. As a result, force is needed when the holding members are rotated in the opposite direction. Further, in the exemplary embodiment, the arc centers Cb and Cd, that is, the respective rotating axes of the rotation of the plurality of holding members 2 when the cable support member 1 is bending-deformed in the one direction, are disposed to be exactly orthogonal to the center axis L of the elastic member 3. An exemplary embodiment in which the rotating axes are almost orthogonal to the center axis L of the elastic member 3 but are orthogonal to the elastic member 3, that is, an exemplary embodiment in which the rotating axes are disposed to be orthogonal to the elastic member 3, is also one of the preferred aspects in terms of optimally balancing ease of being bent in one direction and ease of being bent in the opposite direction.

Figure 9:
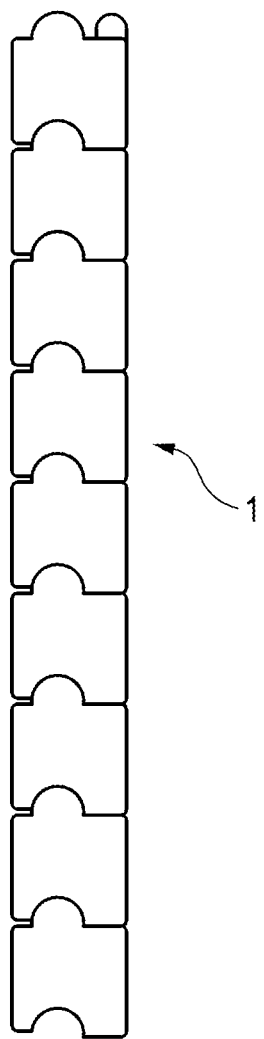
FIG. 9 is a front view of the cable support member of the present invention.

Further, a load, which is needed for bending the cable support member 1 in the opposite direction, has a proportional relationship to the moment, of the force (compression force) applied along the center axis L of the elastic member 3, with respect to the arc centers Ce and Cc spaced apart at the distance a. Thus, in a case in which the cable support member 1 having high bending stiffness in the opposite direction is preferable, the cable support member 1 having high bending stiffness in the opposite direction is implemented by increasing the distance a; for example, increasing an initial extension amount when assembling the cable support member 1 in order to increase the force of the elastic member 3; increasing a spring constant of the elastic member 3; or deforming the second convex portion 2e and the first concave portion 2c of each of the holding members 2 (for example, the second convex portion 2e and the first concave portion 2c are formed in a straight line shape, see FIG. 9). In the bending stiffness in the opposite direction of the cable support member 1 obtained as described above, it is possible to easily implement to increase the bending stiffness in the opposite direction until the deflection amount of bending deformation in the opposite direction, which is produced by self-weights of the cables 11 and the cable support device 10 when the cable support member 1 is disposed in a horizontal direction, becomes substantially zero, and if necessary, it is possible to increase the bending stiffness in the opposite direction to be higher than the above-described bending stiffness.

Further, since the arc centers Cb and Cd of the first convex portion 2b and the second concave portion 2d are positioned on the center axis L of the elastic member 3, it is possible that the straight line shaped elastic member 3 aligns the holding members 2 in a linear fashion in an ordinary state, and holds the joined state of the holding members 2 (the first convex portion 2b and the second concave portion 2d are fitted with each other).

Further, since in the plurality of holding members 2, the convex portions 2h are fitted with the concave portions 2i, even if torsional force, that is, rotating force around the center axis L of the elastic member 3 is applied to the cable support member 1, a situation in which the plurality of holding members 2 are dislocated may be prevented.

Further, the rectangular shaped convex portion 2h and the rectangular shaped concave portion 2i are configured to be fitted with each other (the rectangular shaped convex portion 2h is positioned in the rectangular shaped concave portion 2i) even if the holding members 2 are rotated until the inclined portion 2f and the straight portion 2g come into contact with each other. That is, the rectangular shaped convex portion 2h and rectangular shaped concave portion 2i are configured to prevent a situation in which the plurality of holding members 2 are dislocated at rotational angles of the holding members 2 which are intended in terms of design (in a case in which the holding members are rotated until the inclined portion 2f and the straight portion 2g come into contact with each other).

Further, since the elastic member 3 is fixed to the holding member 2 in a state in which tensile force is applied to the elastic member 3, a compression force is applied between the plurality of holding members 2 such that the support force of the cable is increased, and the cable may be prevented from being deflected downward.

Further, because of the configuration in which the elastic member 3 is not fixed to the holding members 2 but inserted through the holding members 2, and the holding members 2 come into contact with each other by being subjected to the compression force from the elastic member 3 such that the alignment of the holding members 2 is maintained, the holding member 2 or the elastic member 3 is prevented from being broken even if a load in the opposite direction is applied. In addition, in the exemplary embodiment, the elastic member 3 is configured to exert the compression force on the holding members 2 in the neutral state of the cable support member 1 in a linear fashion. Also, an exemplary embodiment in which the elastic member 3 does not exert force on the holding members 2 in the neutral state of the cable support member 1 is also possible. In this case, the plurality of holding members 2, which is fitted with each other at joint surfaces in the straight line state, are not subjected to force from the elastic member 3, but the elastic member 3 exerts force, for example, when the elastic member 3 is bending-deformed in the opposite direction.

Next, referring to the fixing unit 5, in the first exemplary embodiment, the fixing unit 5 are provided at both end portions of the single cable support device 10, and the fixing unit 5, which is positioned in an upper end portion of FIG. 1, is illustrated in a state in which the fixing unit 5 fixes the cables 11, while the fixing unit 5, which is positioned at a lower end portion of FIG. 1, is illustrated in an exploded state. As illustrated in FIG. 1, the fixing unit 5 includes two sheets of plate members 6 which face each other while interposing the tube member 9 and the like therebetween, two metallic stopper fittings 7 which are disposed in the support member insertion passage 9a of the tube member 9 and interposed between the two sheets of plate members 6, and eight fixing screws 8. The plate member 6 is made of a metallic material, and has an outline in which a rectangular shaped long side draws a concave arc while having a schematic rectangular shape thereof, and further, has four holes 6a for being fixed to the metallic stopper fitting 7, and two device fixing holes 6b, for example, for being fixed to a robot driving device (not illustrated) or the like. Further, in order to surely grip and fix the cable 11, the plate member 6 also has three small projections 6c protruding from an inner side thereof.

Figure 5:
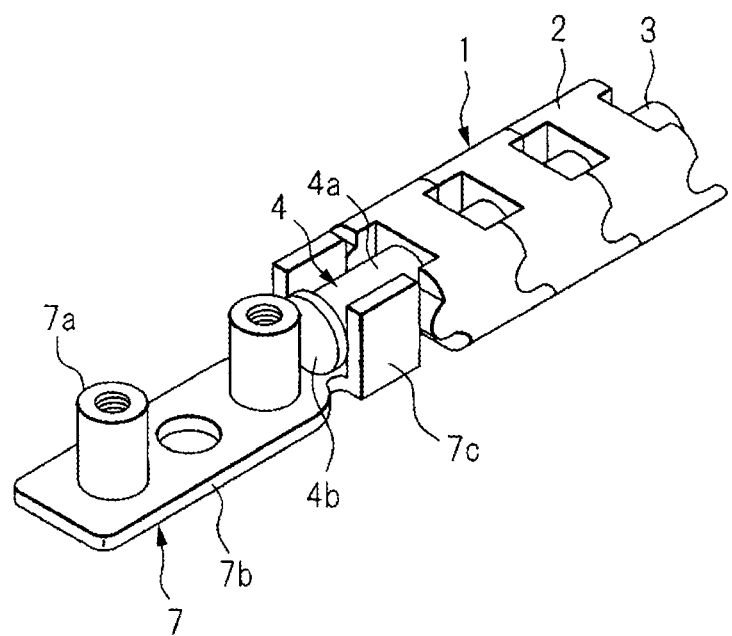
FIG. 5 is a perspective view illustrating a metallic stopper fitting, which is a fixing unit, and an end portion of the cable support member which is attached to the metallic stopper fitting.

FIG. 5 is a partially enlarged perspective view of FIG. 1, and an enlarged perspective view of the metallic stopper fitting 7 and an end portion of the cable support member 1 which is attached to the metallic stopper fitting 7. As illustrated in FIG. 5, the metallic stopper fitting 7 has a stud installation portion 7b on which two studs 7a having a threaded hole are vertically installed, and a horizontal U-shaped portion 7c. The metallic stopper fitting 7 is formed so that the cylinder portion 4a of the sleeve member 4 is fitted into an interior space of the horizontal U-shaped portion 7c thereof, and the flange portion 4b of the sleeve member 4 is disposed between the studs 7a which is adjacent to an end portion of the horizontal U-shaped portion 7c.

In the fixing unit 5 configured as described above, one cable support member 1 having the metallic stopper fittings 7 attached to both ends thereof is disposed at each of the two support member insertion passages 9a which are at both outer sides of the tube member 9, and two sheets of plate members 6 is screw-fixed to the studs 7a of the metallic stopper fitting 7 at an upper side of the tube member 9 in a state in which the cables 11 are inserted through the three cable insertion passages 9b of the tube member 9. This configuration allows to fix t cable support member 1 and the cables 11 to each other in a state in which the cable support member 1 and the cables 11 are accommodated in the tube member 9, and enables the cable support member 1 and the cables 11 to be integrally handled as the cable support device 10.

Next, a cable support device according to a second exemplary embodiment of the present invention will be described. In the cable support device, the tube member 109 is different from that of the first exemplary embodiment, but regarding other points, the cable support device has the same configuration as the first exemplary embodiment. Thus, only a difference will be described with reference to the FIG. 6 that is a cross-sectional view of the tube member 109.

Figure 6:
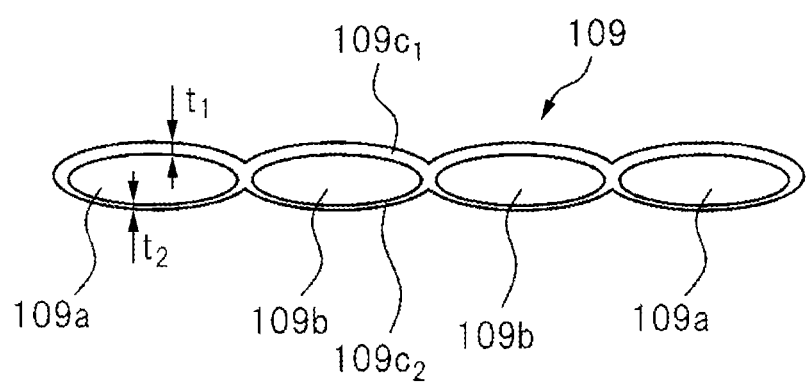
FIG. 6 is a cross-sectional view of a tube member of a cable support device according to a second exemplary embodiment.

The cable support device according to the second exemplary embodiment is illustrated in FIG. 6. The characteristic changed point lies in that a thickness t1 of a wall portion 109c1 at an upper side of the drawing is formed to be thicker than a thickness t2 of a wall portion 109c2 at a lower side of the drawing. Here, an upper side of the tube member 109 of FIG. 6 corresponds to an outer circumferential side and a lower side thereof corresponds to an inner circumferential side when the cable support member 1 and thus the tube member 109 are bent in the one direction so as to be in a U shape. When the cable support device is bent in the U shape and moved, the outer circumferential side of the tube member 109 corresponds to a side where the cable support device comes into contact with other members (not illustrated) on which the cable support device is mounted. Therefore, as the outer circumferential side of the tube member 109 is thick, an effect of attenuating vibration and noise, which occur due to contact with the other members when the cable support device is moved, may be improved. Moreover, as the inner circumferential side becomes thinner, flexibility may be secured, and at the same time, weight reduction is possible.

Figure 7:
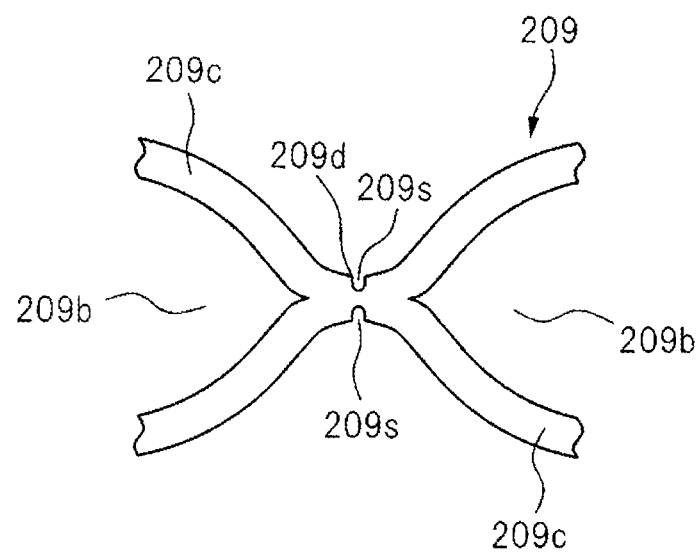
FIG. 7 is a partially enlarged cross-sectional view of a tube member of a cable support device according to a third exemplary embodiment.

Next, a cable support device according to a third exemplary embodiment of the present invention will be described. In the cable support device, the tube member 209 is different from that of the first exemplary embodiment, but regarding other points, the cable support device has the same configuration as the first exemplary embodiment. Thus, only a difference will be described with reference to FIG. 7 that is a partially enlarged cross-sectional view of the tube member 209, and is illustrated on the basis of a connecting portion 209d between two spindle shaped cable insertion passages 209b of the tube member 209.

In the cable support device of the third exemplary embodiment, the respective connecting portions 209d between the plurality of cable insertion passages 209b in which the tube members 209 are disposed in parallel are formed to be separable from each other by a human power. Further, although not illustrated, the connecting portion 209d between the support member insertion passage and the cable insertion passage 209b is also similarly formed. In the connecting portion 209d, slits 209s having a depth corresponding to about ½ of a thickness of the connecting portion 209d in the exemplary embodiment are formed in both upper and lower surfaces. In addition, the reduced thickness of the connecting portion 209d refers to a thickness that is determined as a thickness that enables the cable 11 to be maintained, but broken away by a human power. Further, an exemplary embodiment in which the slit 209s is formed at any one of the upper and lower sides of the drawing is also possible. In addition, an exemplary embodiment in which the connecting portion 209d is to be separable by allowing the overall thickness of the connecting portion 209d to be thinner than a thickness of the wall portion 209c without forming a slit or the like is also possible.

In the cable support device according to the third exemplary embodiment, the cable insertion passage 209b of the tube member 209 at an end side, which is positioned outside the fixing unit 5, may be simply separated from the adjacent insertion passage at the connecting portion 209d, and as a result, even if positions of access points of the plurality of cables 11 are spaced apart from each other, the plurality of cables 11 may access the respective access points in a state in which the plurality of cables 11 are protected by the tube member 209.

Next, a cable support device according to a fourth exemplary embodiment will be described with reference to FIG. 8 that is a cross-sectional view thereof. In the cable support device, the tube member 309 is different from that of the first exemplary embodiment, but regarding other points, the cable support device has the same configuration as the first exemplary embodiment. Thus, only a difference will be described.

Figure 8:
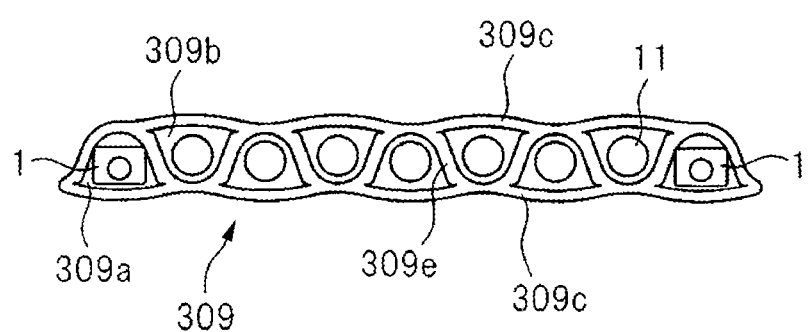
FIG. 8 is a schematic cross-sectional view of a cable support device according to a fourth exemplary embodiment.

The characteristics of the cable support device according to the fourth exemplary embodiment are different from that of the first exemplary embodiment in that the cable support device has a cross-sectional shape as illustrated in FIG. 8. Therefore, the tube member 309 according to the fourth exemplary embodiment has two outer wall portions 309c which have an outer surface and face each other, and a partition wall portion 309e which is formed between the two outer wall portions 309c and has a wave-shaped cross-section such that the partition wall portion 309e is coupled to the top portions of respective wave shapes of the two outer wall portions 309c. As a result, a support member insertion passage 309a and a cable insertion passage 309b are formed by one wave shaped portion of the partition wall portion 309e and the outer wall portion 309c, respectively.

By forming the tube member 309 like the fourth exemplary embodiment, the cables 11 may be wired at high density by decreasing the porosity in comparison with a tube member having an insertion passage having an oval, elliptical, or spindle shaped cross section, while bending stiffness of the tube member may be decreased in comparison with a tube member, for example, having an insertion passage having a rectangular cross section having a low porosity.

The cable support device 10 of the first exemplary embodiment has two cable support members 1. In the present invention, as other exemplary embodiments, an exemplary embodiment (not illustrated) in which the number of cable support members 1 is one or three or more is also possible, and the disposition locations of the cable support members 1 are not limited to both outer sides of the tube member 9 but may be various positions. Similarly, an exemplary embodiment in which one cable insertion passage 9b is provided instead of a plurality of cable insertion passages 9b of the tube member is also possible.

Further, in the first exemplary embodiment, the arc centers Cb and Cd of the first convex portion 2b and the second concave portion 2d of the holding member 2 of the cable support member 1 are positioned on the center axis L of the elastic member 3, and the arc centers Ce and Cc of the second convex portion 2e and the first concave portion 2c are positioned on the straight line La that is spaced apart from the center axis L at the distance a. In the present invention, an exemplary embodiment in which the arc centers Cb and Cd of the first convex portion 2b and the second concave portion 2d are not positioned on the center axis L of the elastic member 3, but are positioned at a position closer to the center axis L than the arc centers Ce and Cc of the second convex portion 2e and the first concave portion 2c is also possible. In the exemplary embodiment, the cable support member also has a property that the cable support member is easy to be bent in the one direction but difficult to be bent in the opposite direction.

Further, while the first convex portion 2b and the second concave portion 2d are provided, an exemplary embodiment in which a cable support member is provided with a holding member (not illustrated), which does not have the second convex portion 2e and the first concave portion 2c is also possible. In the exemplary embodiment, bending deformation of the cable support member in both the one direction and the opposite direction is caused by a result of rotations of the first convex portion 2b and the second concave portion 2d of each of holding members 2 about the arc centers Cb and Cd.

Further, the plurality of holding members 2 of the cable support member 1 have a simple configuration in which the plurality of holding members 2 merely come into contact with each other at the joint surfaces (joining portion), and thus the length of the holding members 2 in the axial direction (the longitudinal direction of the cable) may be considerably shorter than that illustrated in FIG. 3B, and for example, may be ½ or less. By shortening the length of the holding members 2 in the axial direction as described above, the cable support member 1 having a small minimum radius of curvature may be obtained.

The invention claimed is:
1. A cable support member comprising:
a plurality of holding members; and
an elastic member,
wherein each holding member has an elastic member insertion passage in a longitudinal direction of the cable support member through which the elastic member is inserted, and further has joint surfaces that enable a rotation of the holding member in a state in which the holding member comes into contact with holding members adjacent to the holding member at both sides in the longitudinal direction of the cable support member,
the elastic member is inserted through the elastic member insertion passage in each of the plurality of holding members so as to align and hold the plurality of holding members, and the elastic member exerts a compression force on the plurality of holding members in the longitudinal direction of the cable support member, and
in an overall shape of the cable support member, a neutral state in which the cable support member is substantially in a linear fashion and a curved state in which the cable support member is bending-deformed are obtainable.

2. The cable support member of claim 1, wherein the cable support member is configured to be elastically bendable in one direction and an opposite direction to the one direction from the neutral state, and a deflection amount of bending deformation in the opposite direction is smaller than a deflection amount of bending deformation in the one direction when the cable support member is subjected to a bending load.

3. The cable support member of claim 1, wherein when a cable is held in a horizontal direction, a deflection amount of bending deformation of the cable support member in the opposite direction due to a self-weight thereof is substantially zero.

4. The cable support member of claim 1, wherein the elastic member is disposed to be orthogonal to each of rotating axes of the plurality of holding members that are rotated when the cable support member is bending-deformed in the one direction.

5. The cable support member of claim 1, wherein the elastic member is a cylindrical coil spring.

6. A cable support device comprising:
at least one cable support member that extends along a longitudinal direction of a cable to be supported; and
a tube member made of a flexible material, the tube member having at least one support member insertion passage through which the cable support member is inserted, and one or a plurality of cable insertion passages through which the cable is inserted, the one or plurality of cable insertion passages being disposed in parallel with the support member insertion passage,
wherein the cable support member comprises:
a plurality of holding members; and
an elastic member,
wherein each holding member has an elastic member insertion passage in a longitudinal direction of the cable support member through which the elastic member is inserted, and further has joint surfaces that enable a rotation of the holding member in a state in which the holding member comes into contact with holding members adjacent to the holding member at both sides in the longitudinal direction of the cable support member,
the elastic member is inserted through the elastic member insertion passage in each of the plurality of holding members so as to align and hold the plurality of holding members, and the elastic member exerts a compression force on the plurality of holding members in the longitudinal direction of the cable support member, and
in an overall shape of the cable support member, a neutral state in which the cable support member is substantially in a linear fashion and a curved state in which the cable support member is bending-deformed are obtainable.

7. The cable support device of claim 6, wherein a thickness of a wall portion of the tube member, which is positioned at an outer circumferential side when the cable support device is bending-deformed in one direction, is thicker than a thickness of a wall portion which is positioned at an inner circumferential side when the support device is bending-deformed in the one direction.

8. The cable support device of claim 6, wherein each of connection portions between the plurality of cable insertion passages of the tube member, which are disposed in parallel, and between the cable insertion passage and the support member insertion passage are formed to be separable from each other by a human power.

9. The cable support device of claim 6, wherein the tube member has two outer wall portions having outer surfaces and facing each other, and a partition wall portion having a wave-shaped cross section, the partition wall portion being installed between the two outer wall portions and coupled to the two outer wall portions at respective top portions of wave shapes, and the support member insertion passage and/or the cable insertion passage are formed by one wave shaped portion of the partition wall portion and the outer wall portions.

10. A cable support member comprising:
a plurality of holding members each of which has a through hole formed therein, each holding member having joining portions to be rotatable in a state in which the holding member is joined with other holding members at respective opening sides of the through hole; and
an elastic member having elasticity, which is inserted through the through hole in each of the plurality of holding members joined at the joining portions,
wherein, in a state in which the elastic member is inserted through and fixed to the plurality of holding members, the holding members are held in a joined state, and
in a case where from a state in which the holding members are joined in a linear fashion, the joined holding members are rotated in one direction and an opposite direction to the one direction, a displacement amount of the elastic member being displaced against an elastic force thereof when the holding members are rotated in the one direction is smaller than a displacement amount of the elastic member being displaced against the elastic force thereof when the holding members are rotated in the opposite direction.

11. The cable support member of claim 10, wherein the elastic member is fixed to the holding members while tensile force is applied.

12. The cable support member of claim 10, wherein the through hole is formed so that a center of a longitudinal axis of the elastic member is disposed on rotating axes about which the plurality of holding members is rotated in the one direction at the joining portions.

* * * * *